United States Patent
Diko

(10) Patent No.: US 7,669,940 B2
(45) Date of Patent: Mar. 2, 2010

(54) ADAPTABLE WHEEL ASSEMBLY

(76) Inventor: Sulahian Diko, 12717 Ann St., Santa Fe Springs, CA (US) 90670-2971

( * ) Notice: Subject to any disclaimer, the term of this patent is extended or adjusted under 35 U.S.C. 154(b) by 0 days.

(21) Appl. No.: 12/118,154

(22) Filed: May 9, 2008

(65) Prior Publication Data

US 2009/0278398 A1   Nov. 12, 2009

(51) Int. Cl.
*B60B 7/00* (2006.01)
(52) U.S. Cl. .............................. 301/37.106; 301/37.371
(58) Field of Classification Search ............ 301/37.101, 301/37.102, 37.34, 37.371, 37.106, 37.42, 301/37.26, 37.28, 37.108, 37.109
See application file for complete search history.

(56) References Cited

U.S. PATENT DOCUMENTS

| | | | | |
|---|---|---|---|---|
| 2,386,245 | A | * | 10/1945 | Lyon ..................... 301/37.101 |
| 3,726,566 | A | * | 4/1973 | Beith ..................... 301/37.108 |
| 4,645,268 | A | | 2/1987 | Carlson |
| 5,346,288 | A | | 9/1994 | Hodge et al. |
| 5,443,582 | A | | 8/1995 | Ching |
| 5,820,225 | A | | 10/1998 | Ferriss et al. |
| 6,663,189 | B2 | | 12/2003 | Enomoto et al. |
| 6,805,413 | B2 | | 10/2004 | Fitzgerald |
| 7,055,915 | B2 | | 6/2006 | Fitzgerald |

FOREIGN PATENT DOCUMENTS

| | | |
|---|---|---|
| EP | 1 725 313 A1 | 2/2007 |
| JP | 2006-116985 | 11/2006 |
| WO | WO 2005/037571 A1 | 4/2005 |

* cited by examiner

*Primary Examiner*—Jason R Bellinger
(74) *Attorney, Agent, or Firm*—Berenato & White, LLC

(57) ABSTRACT

An adaptable wheel assembly, comprises an integral wheel and a cover member removably attached to the wheel. A disk portion of the wheel is formed without decorative openings therethrough and has an angularly uniform outer surface. The disk portion of the wheel has first threaded holes provided adjacent a rim portion of the wheel, while a hub portion thereof includes at least one second threaded hole provided adjacent a pilot bore of the wheel. The cover member has a plurality of first holes aligned with the first threaded holes and at least one second hole aligned with the at least one second threaded hole. First threaded fasteners extend through the first holes to engage the first threaded holes, while at least one second threaded fastener extends through the at least one second hole to engage the at least one second threaded hole.

9 Claims, 10 Drawing Sheets

ADAPTABLE WHEEL ASSEMBLY

BACKGROUND OF THE INVENTION

1. Field of the Invention

The present invention pertains generally to custom wheel and more particularly to an adaptable custom wheel assembly that may be altered and updated by affixing a cover member to a blank wheel body.

2. Background of the Invention

Automobiles have become the primary means of transportation for many people in this day and age. In addition to providing transportation, automobiles have also become a visible symbol of what type of person someone is. Some wealthy people perceive expensive automobiles as a status symbol, while a rugged individualist will often drive a sport-utility type vehicle. Other people like to express themselves by painting their automobiles bold colors, or by decorating their automobiles with a variety of custom, personalized items.

As a result of the high number of people who customize their automobiles, a large market has been created which caters exclusively to after-market automobile products. With new technology in metal production, one of the most popular items used to customize or up-grade an automobile is the wheel.

The appearance of an automobile with these custom wheels, when compared to an automobile with standard wheels, or even hubcaps, is substantially noticeable. For people who want the ultimate in high-quality and luxury, chrome-plated versions of standard alloy wheels are the wheels of choice, many luxury cars come either with chrome-plated wheels standard, or as an option. However, many have to purchase the custom wheels from an aftermarket company. Regardless of how a person may acquire chrome-plated wheels they can often be very expensive. Additionally, purchasers of these expensive custom wheels must choose a single style and look or later purchase a second set of custom wheels.

FIGS. 1 and 2 show a conventional one-piece wheel 1 that includes an annular rim portion 2 concentric to a central axis 3 of the wheel 1, a hub portion 4 adapted to being fastened to a vehicle hub (not shown) through a pilot bore 5 concentric with the central axis 3 by a plurality of threaded lug fasteners (not shown), and a disk portion 6 extending radially inwardly from the rim portion 2 to the hub portion 4. Lug holes 7 are provided in the hub portion 4 around the pilot bore 5 of the wheel 1 at a certain bolt circle diameter for receiving the threaded lug fasteners, such as lug bolts or lug studs, therethrough. Typically, the annular rim portion 2 has a small ridge that holds a tire bead on the rim during a tire blow-out or flat. There is also provided a standard aperture for the known valve stem (not shown). The disk portion 6 typically includes a plurality of decoration holes 8 formed therethrough.

It is known to provide conventional wheels (e.g., custom alloy wheels) with a stylized spider section and a center cap (not shown) at the pilot bore 5 to cover the pilot bore 5 with an ornamental appearance or a company unique logo. The conventional center cap is affixed to the wheel via a snap-fit or friction-fit arrangement.

It is known to provide conventional wheels with snap-on wheel covers (known also as hub caps). Many types of wheel covers have been used to provide attractive designs and the currently popular types of wheels. For example, considerable effort has been made to simulate a cast aluminum rim by the use of a shielding disc with a cover that has individual sections such as spokes. Many other wheel covers have the capability of displaying indicia and designs that include symmetrical design arrays as well as decorative designs using irregular shaped voids. However, these conventional wheel covers are typically not durable enough to withstand the rigors of everyday use and lack the superior quality of true custom wheel.

The need exists for a system that provides custom wheels that may be altered and updated without the need to purchase an entirely new set of wheels.

SUMMARY OF THE INVENTION

The present invention provides an adaptable wheel assembly for a motor vehicle, such that an ornamental appearance of the adaptable wheel assembly may be readily altered and updated without the need to purchase an entirely new set of wheels.

The adaptable wheel assembly comprises an integral blank wheel and a cover member removably attached to the blank wheel. The integral blank wheel has a central axis and including an annular rim portion coaxial to the central axis, an annular hub portion provided with a pilot bore coaxial with the central axis, and an annular disk portion radially extending between the rim and the hub portions of the blank wheel. The front cover member is removably attached to the blank wheel by a plurality of first threaded fasteners provided adjacent the rim portion and at least one second threaded fastener provided adjacent the central bore and radially inside the first threaded fasteners. The disk portion is formed without decorative windows therethrough and has an angularly uniform, uninterrupted axially outer surface defined as a surface of revolution that faces the front cover member. The disk portion has a plurality of first threaded holes provided adjacent the rim portion of the blank wheel and circumferentially spaced from each other for receiving the first threaded fasteners. The hub portion of the blank wheel includes a plurality of angularly spaced lug holes and at least one second threaded hole spaced from the lug holes and provided for receiving the at least one second threaded fastener. The cover member, in turn, has a plurality of first holes being in alignment with the first threaded holes of the blank wheel and at least one second hole being in alignment with the at least one second threaded hole of the blank wheel. The first threaded fasteners extend through the first holes in the cover member and engage the first threaded holes in the blank wheel, while the at least one second threaded fastener extends through the at least one second hole in the cover member and engages the at least one second threaded hole in the blank wheel. The cover member is further provided with a central hole therethrough coaxial with the pilot bore in the blank wheel and a plurality of decorative openings therethrough radially spaced from the central hole so as to expose the axially outer surface of the disk portion of the blank wheel.

The cover member of the adaptable wheel assembly may be interchangeable with an additional modified cover member so that a user may customize and update the style and look of a wheel at a reduced expense. The cover member according to the present invention can simulate the spokes of conventional alloy wheels.

Therefore, the present invention provides an adaptable custom wheel assembly with an ornamental appearance that may be readily altered by the user to be changed and updated.

These and other objects and advantages of the present invention will become apparent from the subsequent detailed description of the preferred embodiment and the appended claims taken in conjunction with the accompanying drawings.

DETAILED DESCRIPTION OF THE PREFERRED EMBODIMENT

Figure 1:
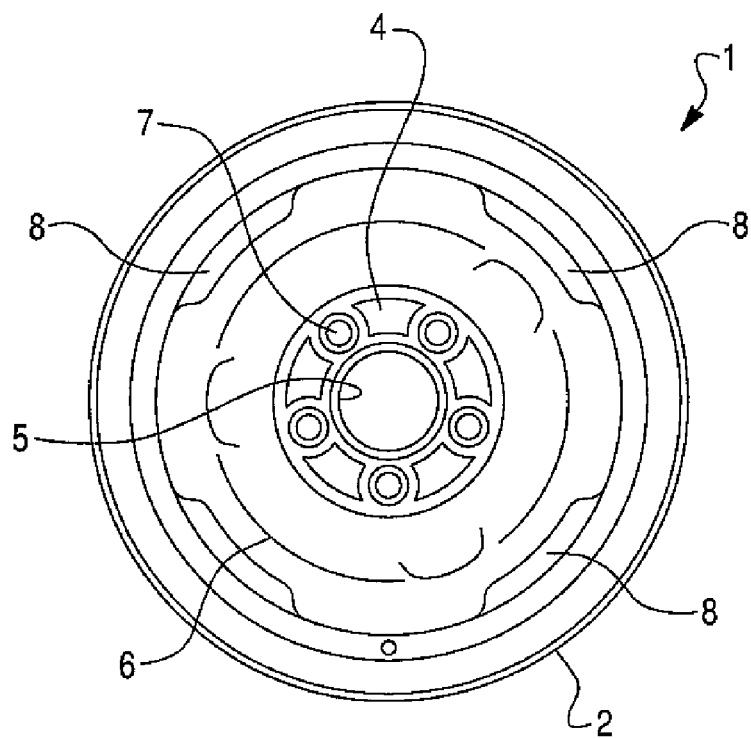
FIG. 1 is a front view of a convention wheel.
Figure 2:
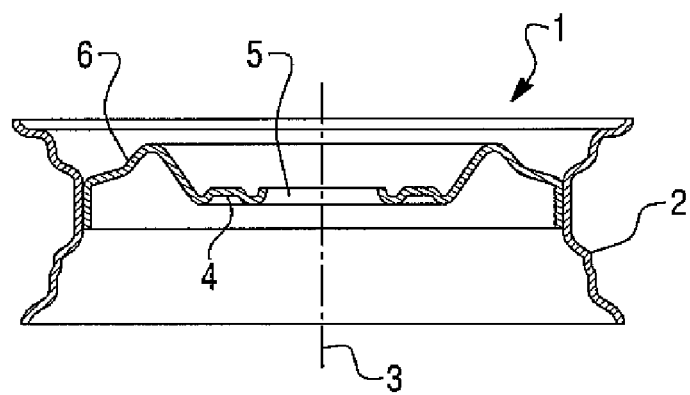
FIG. 2 is a top view of the conventional wheel shown in FIG. 1.

The preferred embodiment of the present invention will now be described with the reference to accompanying drawings.

For purposes of the following description, certain terminology is used in the following description for convenience only and is not limiting. The words such as "outer" and "inner", "inwardly" and "outwardly", "left" and "right", "axially" and "radially" designate directions in the drawings to which reference is made. The terminology includes the words specifically mentioned above, derivatives thereof and words of similar import. Additionally, the word "a", as used in the claims, means "at least one".

FIGS. 3-9B show an adaptable, custom vehicle wheel assembly 10 according to the preferred embodiment of the present invention, however, the specific structure and layout of these figures is not intended to limit the scope of the present invention. The present invention as described below may be applied to any style of wheel including, but not limited to, a two-piece or three-piece wheel assembly. The invention is equally applicable to any manufacturing method, i.e., forged, cast, rolled, etc.

As shown in FIGS. 3-7, the adaptable wheel assembly 10 according to a preferred exemplary embodiment of the present invention comprises an integral blank wheel 12 and a front cover member 14 formed separately from the blank wheel 12 and removably and interchangeably fastened to the blank wheel 12.

Figure 5:
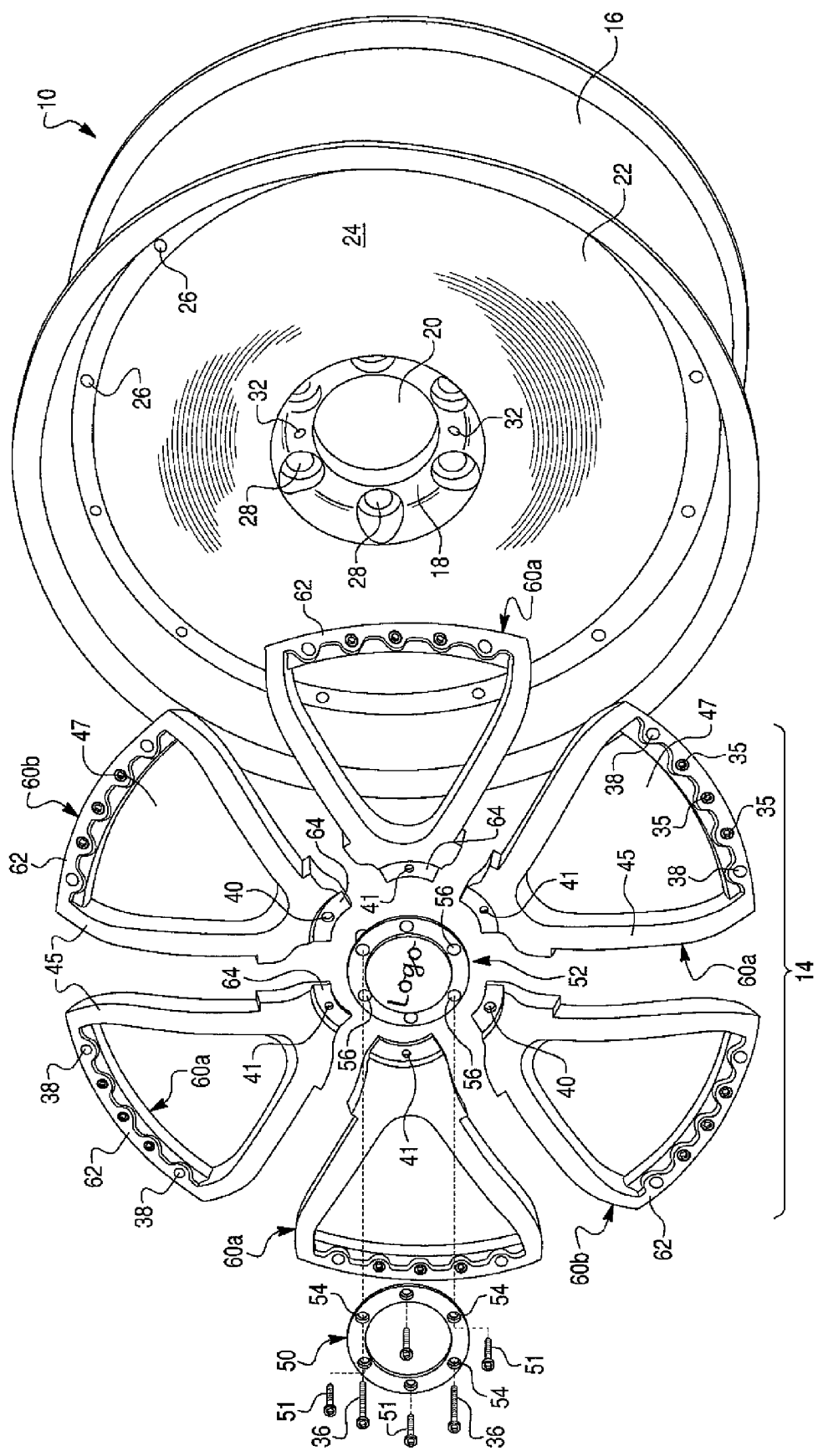
FIG. 5 is an exploded perspective view of the adaptable wheel assembly according to the preferred embodiment of the present invention showing a plurality of separate cover sections of a cover member.
Figure 6:
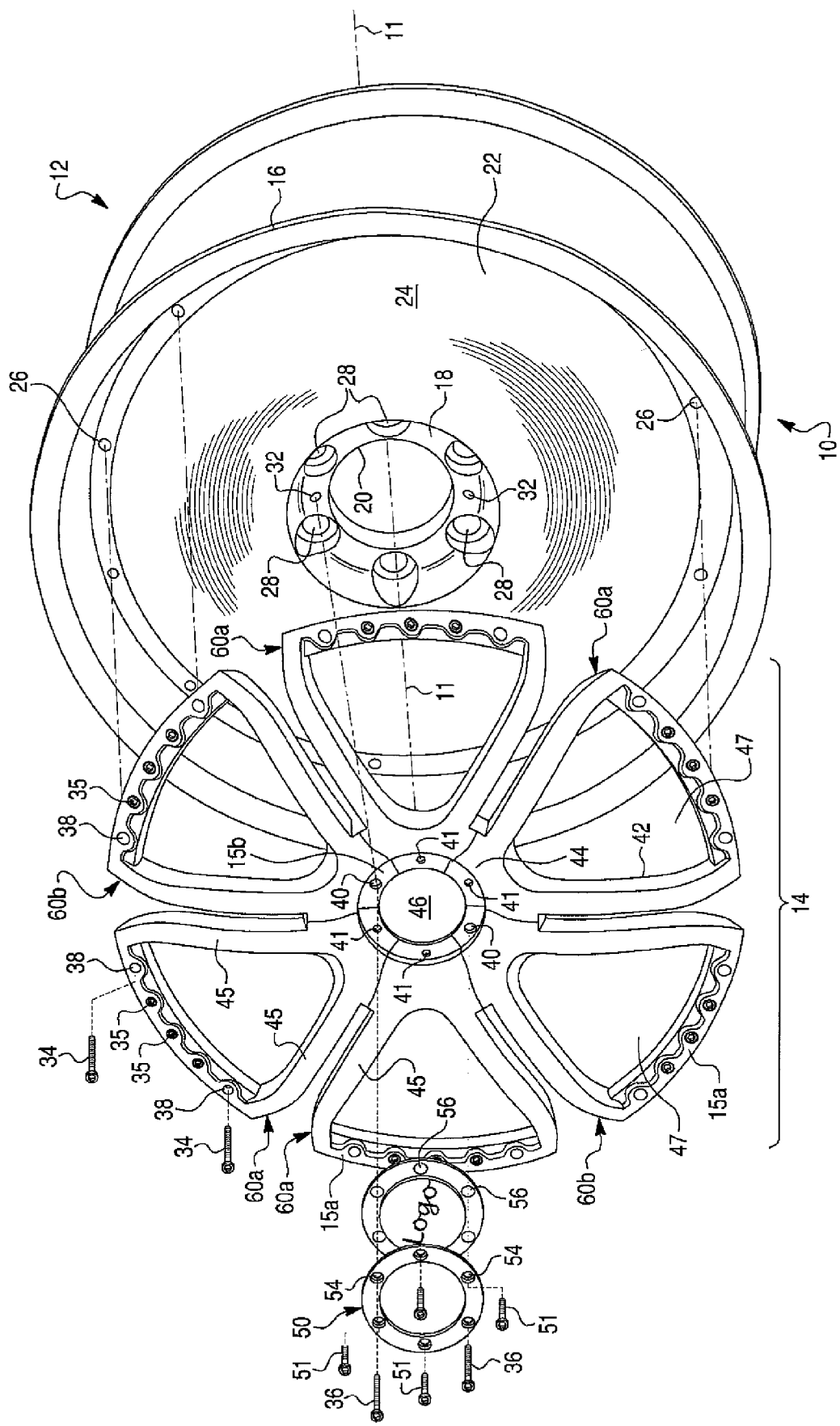
FIG. 6 is an exploded perspective view of the adaptable wheel assembly according to the preferred embodiment of the present invention showing interconnected cover sections of a cover member.
Figure 7:
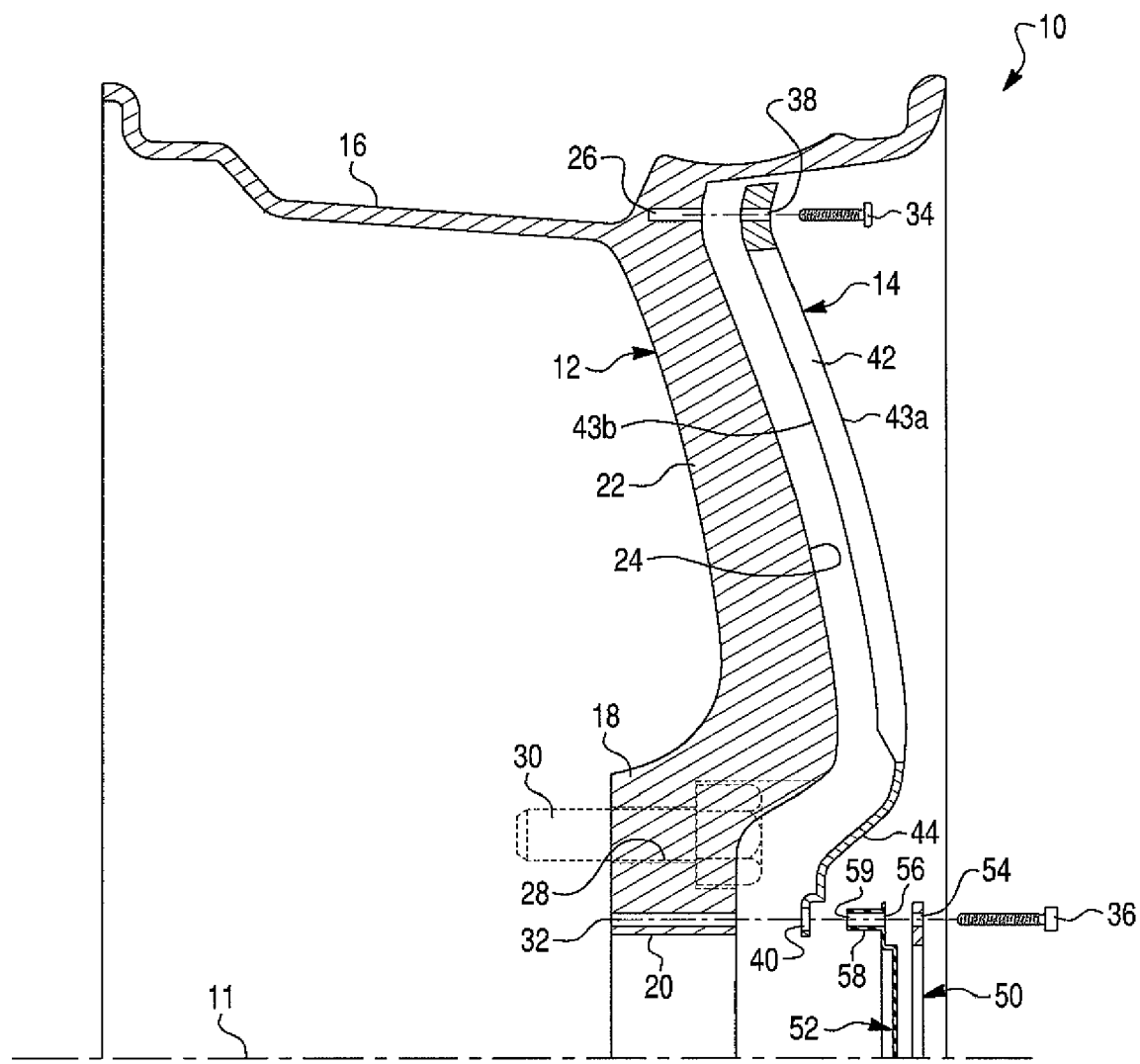
FIG. 7 is an exploded sectional view of the adaptable wheel assembly according to the preferred embodiment of the present invention.
Figure 8A:
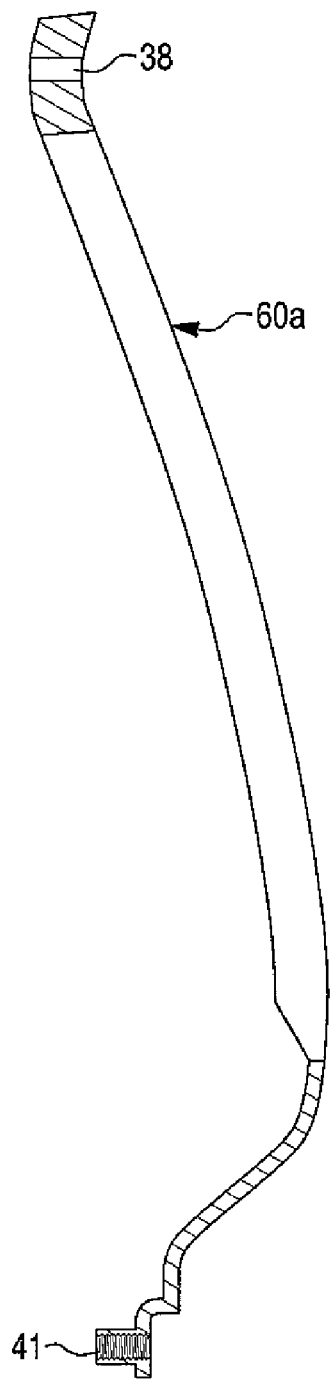
FIG. 8A is a front view of a first cover section of the cover member according to the preferred embodiment of the present invention.
Figure 8B:
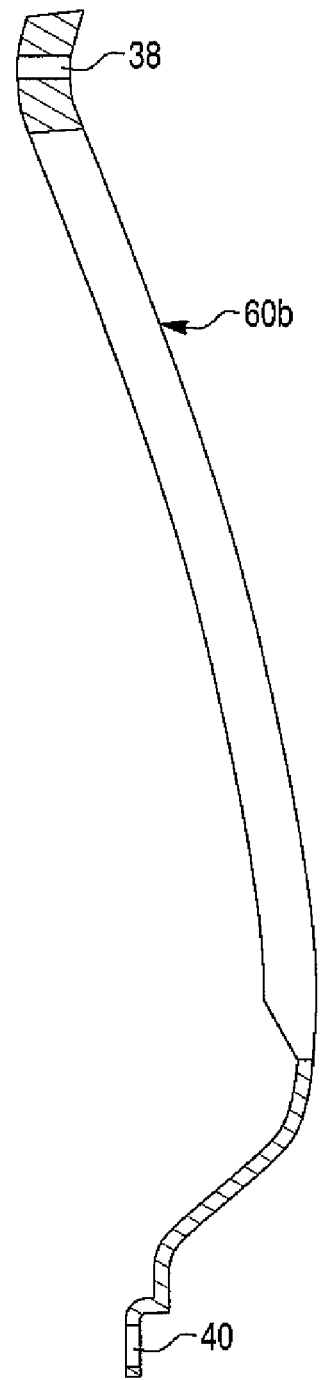
FIG. 8B is a front view of a second cover section of the cover member according to the preferred embodiment of the present invention.

The integral blank wheel 12 has a central axis 11 and includes a conventional annular rim portion 16 coaxial (or concentric) to the central axis 11 of the blank wheel 12, an annular hub portion 18 provided with a central (or pilot) bore 20 also coaxial with the central axis 11, and an annular disk portion 22 radially extending between the rim portion 16 and the hub portion 18. The disk portion 22 of the blank wheel 12 is formed without any decorative openings (windows) therethrough and has an angularly uniform, uninterrupted axially outer surface 24 defined as a surface of revolution. As illustrated, the axially outer surface 24 of the disk portion 22 of the blank wheel 12 faces the front cover member 14. Preferably, the axially outer surface 24 of the blank wheel 12 is chrome plated. It will be appreciated that any other treatment of the axially outer surface 24, such as polishing, paint coating (e.g. painted black), etc., is within the scope of the present invention. An annular radially outer end (or periphery) of the disk portion 22 of the blank wheel 12 is provided with a plurality of first threaded holes 26 adjacent the rim portion 16 and angularly (circumferentially) spaced from each other at a certain circle diameter, as illustrated in FIGS. 5 and 6. The hub portion 18 of the blank wheel 12 includes a plurality of angularly (circumferentially) spaced lug holes 28 and at least one second threaded hole 32 disposed adjacent to one of the lug holes 28. Preferably, as illustrated in FIGS. 5 and 6, the hub portion 18 of the blank wheel 12 includes two opposite second threaded holes 32 disposed between two adjacent the lug holes 28 and angularly (circumferentially) spaced therefrom on opposite sides of the pilot bore 20. The lug holes 28 are provided around the pilot bore 20 of the blank wheel 12 at a certain bolt circle diameter for receiving threaded lug fasteners, such as lug bolts 30 (shown in FIGS. 4 and 7) or lug studs, therethrough. In other words, the second threaded holes 32 are disposed radially inside the first threaded holes 26 of the blank wheel 12.

Figure 3:
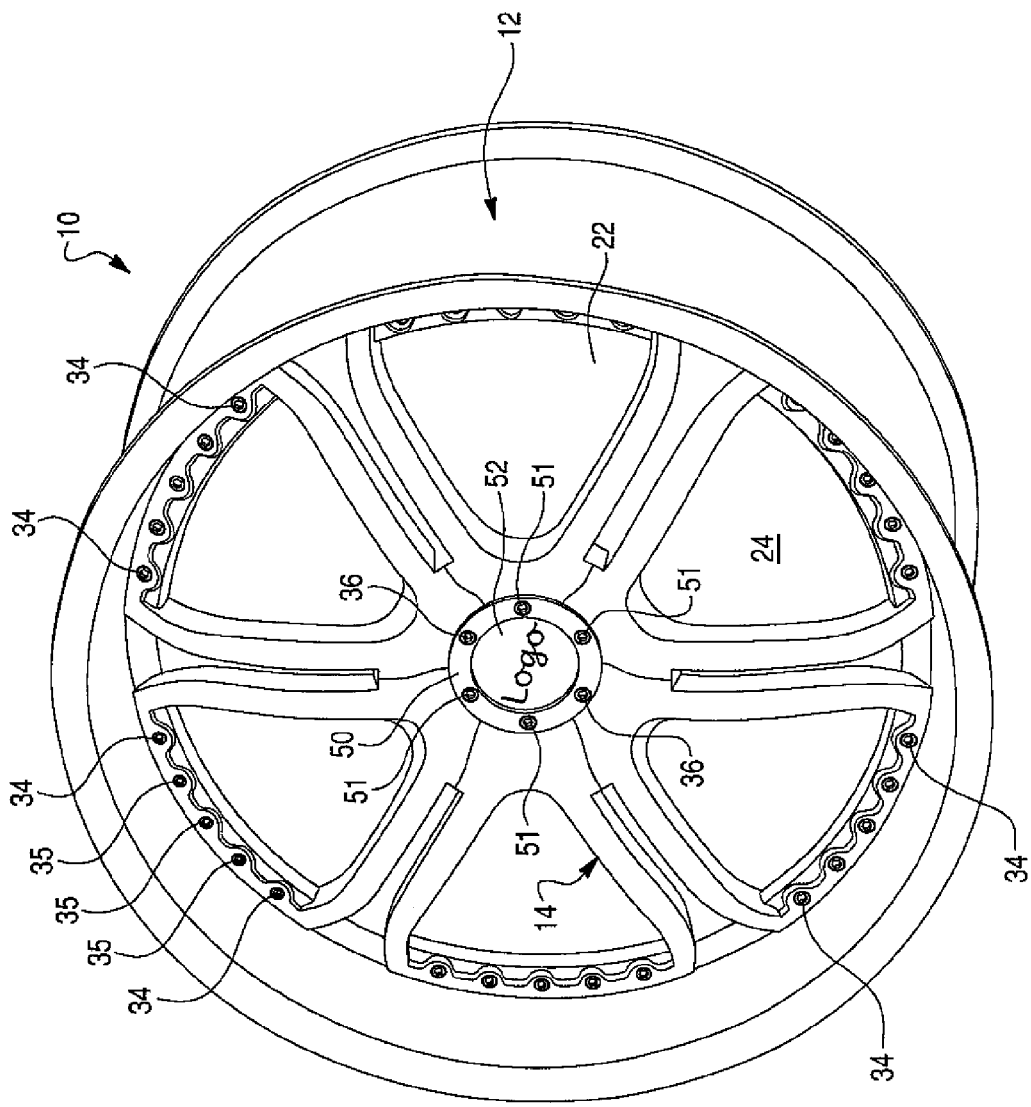
FIG. 3 is a perspective view of an adaptable wheel assembly according to the preferred embodiment of the present invention.

The cover member 14 is removably attached to the blank wheel 12 by a plurality of first threaded fasteners 34 provided adjacent the rim portion 16, and at least one, but preferably two second threaded fasteners 36 provided adjacent the central bore 20 of the hub portion 18 and radially inside the first threaded fasteners 34. As further illustrated in FIGS. 4-7 and 8B, the cover member 14 has a plurality of first holes 38 therethrough being in alignment with the first threaded holes 26 of the blank wheel 12, and at least one second hole 40 therethrough being in alignment with the at least one second threaded hole 32 of the blank wheel 12. In other words, the first holes 38 of the cover member 14 are provided at a radially outer end 15a thereof, while the at least one second hole 40 of the cover member 14 is provided at a radially inner end 15b thereof. Preferably, as illustrated in FIGS. 3 and 5, the cover member 14 includes two includes two opposite second holes 40 being in alignment with two second threaded hole 32 of the blank wheel 12. It will be appreciated that the first threaded fasteners 34 are provided to extend through the first holes 38 in the cover member 14 and threadedly engage the complementary first threaded holes 26 in the disk portion 22 of the blank wheel 12, while the second threaded fasteners 36 are provided to extend through the second holes 40 in the cover member 14 and threadedly engage the complementary second threaded holes 32 of the hub portion 18 of the blank wheel 12 so as to removably fasten the cover member 14 to the blank wheel 12.

Further preferably, the cover member 14 is provided with a plurality of ornamental elements 35 visually resembling outer heads of the first threaded fasteners 34 and angularly (circumferentially) spaced from each other at the same diameter as the first threaded fasteners 34.

Preferably, the cover member 14 is made of a plastic material. Alternatively, the cover member 14 may be made of any other appropriate material, such as metal.

The cover member 14 includes an ornamental portion 42 covering the disk portion 22 of the blank wheel 12 and including the first holes 38, and a mounting portion 44 covering the hub portion 18 of the blank wheel 12 and including the second holes 40. As illustrated in detail in FIG. 7, the ornamental portion 42 of the cover member 14 has an axially outer surface 43a, and an axially inner surface 43b disposed opposite the outer surface 43a in the direction of the central axis 11 of the blank wheel 12. It will be appreciated that the axially outer surface 43a of the ornamental portion 42 of the cover member 14 is visible from the outside of a motor vehicle when the wheel assembly 10 is mounted to the motor vehicle, while the axially inner surface 43b of the ornamental portion 42 of the cover member 14 faces the disk portion 22 of the blank wheel 12. Moreover, the inner surface 43b of the ornamental portion 42 of the cover member 14 is contoured complementary to the outer surface 24 of the disk portion 22 of the blank wheel 12. Consequently, when the wheel assembly 10 is fully assembled, the inner surface 43b of the ornamental portion 42 of the cover member 14 is in contact (i.e. is juxtaposed with) the outer surface 24 of the disk portion 22 of the blank wheel 12 so as to continuously engage the axially outer surface 24 of the disk portion 22 of the blank wheel 12 both radially and circumferentially.

Moreover, as further illustrated in FIGS. 4-6 and 8A, the mounting portion 44 of the cover member 14 further includes a plurality of threaded mounting holes 41. Preferably, the threaded mounting holes 41 are disposed on the same circle diameter as the second holes 40 so that the second holes 40 and the mounting holes 41 are circumferentially equidistantly spaced from each other. As further illustrated in detail in FIG. 4, the mounting portion 44 of the cover member 14 is axially spaced from the hub portion 18 of the blank wheel 12 in the direction of the central axis 11 so as to cover the lug bolts 30.

In accordance with the preferred embodiment of the present invention, the ornamental portion 42 of the cover member 14 includes a plurality of spokes 45 radially extending from the mounting portion 44 and circumferentially spaced from each other so as to expose the axially outer surface 24 of the disk portion 22 of the blank wheel 12. The extended spokes 45 extend radially outward to the first threaded holes 26 provided at the periphery of the blank wheel 12 where the disk portion 22 meets the rim portion 16 of the blank wheel 12. The cover member 14 is provided with a central hole 46 therethrough coaxial with the pilot bore 20 in the blank wheel 12, and a plurality of decorative openings (windows) therethrough, such as openings 47 defined between by a space between the spokes 45, so that in an assembled condition of the adaptable wheel assembly 10, the outer surface 24 of the disk portion 22 of the blank wheel 12 is exposed, i.e. visible from the outside of the wheel assembly 10 through the openings 47. The ornamental portion 42 of the cover member 14 formed with the spokes 45 and the apertures 47 or other ornamentation enhances the ornamental appearance of an outer face of the wheel assembly 10.

According to the preferred embodiment of the present invention, the adaptable wheel assembly 10 further comprises a connecting ring 50 and a center cap 52 provided to cover the pilot bore 20. The center cap 52 is provided with an ornamental appearance or a company unique logo. Moreover, the center cap 52 is formed with a stepped flange 53 complementary to the connecting ring 50 and provided for supporting the connecting ring 50 thereon. Both the connecting ring 50 and the center cap 52 are provided with an equal plurality of mounting holes 54 and 56, respectively. Each of the plurality of mounting holes 54 and 56 are disposed on the same circle diameter and are circumferentially equidistantly spaced from each other, and are in alignment with each other. Furthermore, both the mounting holes 54 and 56 are in alignment with the second holes 40 and the mounting holes 41 of the mounting portion 44 of the cover member 14. It should be understood, than the number of mounting holes 54 in the connecting ring 50 equals the sum of the second holes 40 and the mounting holes 41 of the mounting portion 44 of the cover member 14. It will be appreciated that in the assembled condition of the adaptable wheel assembly 10, the connecting ring 50 and the center cap 52 are removably fastened to the mounting portion 44 of the cover member 14 a plurality of third threaded fasteners 51. The third threaded fasteners 51 axially extend through the corresponding (not all) mounting holes 54 and 56 in the connecting ring 50 and the center cap 52, respectively, and threadedly engage the threaded mounting holes 41 in the mounting portion 44 of the cover member 14, thus removably fastening the connecting ring 50 and the center cap 52 to the cover member 14. The second threaded fasteners 36 axially extend through the remaining mounting holes 54 and 56 in the connecting ring 50 and the center cap 52, respectively, and threadedly engage the second threaded hole 32 in the hub portion 18 of the blank wheel 12, thus removably fastening the mounting portion 44 of the cover member 14 to the blank wheel 12.

The center cap 52 further includes at least one support cylinder 58 formed integrally therewith and axially extended in the direction of the central axis 11 toward the blank wheel 12. The support cylinder 58 is oriented coaxially with the corresponding mounting hole 56 so that a through-hole 59 in the support cylinder 58 is in alignment with the corresponding mounting hole 56. The support cylinder 58 axially supports the center cap 52 against the hub portion 18 of the blank wheel 12 and provides the spacing therebetween. Preferably, as further illustrated in FIG. 4, the center cap 52 includes two support cylinders 58 each formed integrally therewith and axially extended in the direction of the central axis 11 toward the blank wheel 12 to support the center cap 52 against the hub portion 18 of the blank wheel 12 and provide the spacing therebetween. Each of the support cylinders 58 is in alignment with the corresponding mounting hole 56.

Figure 10:
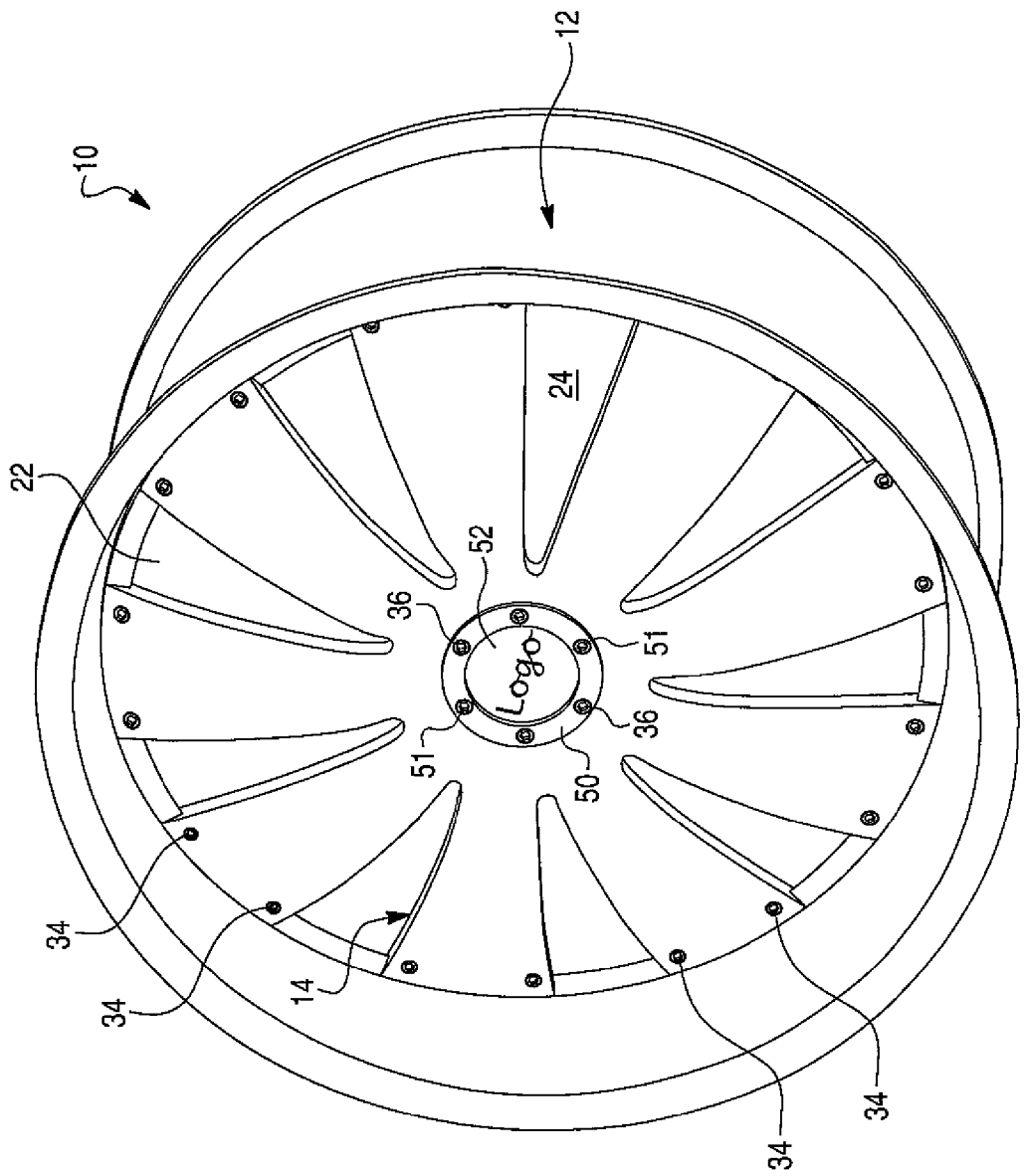
FIG. 10 is a perspective view of the adaptable wheel assembly according to the alternative embodiment of the present invention.
Figure 11:
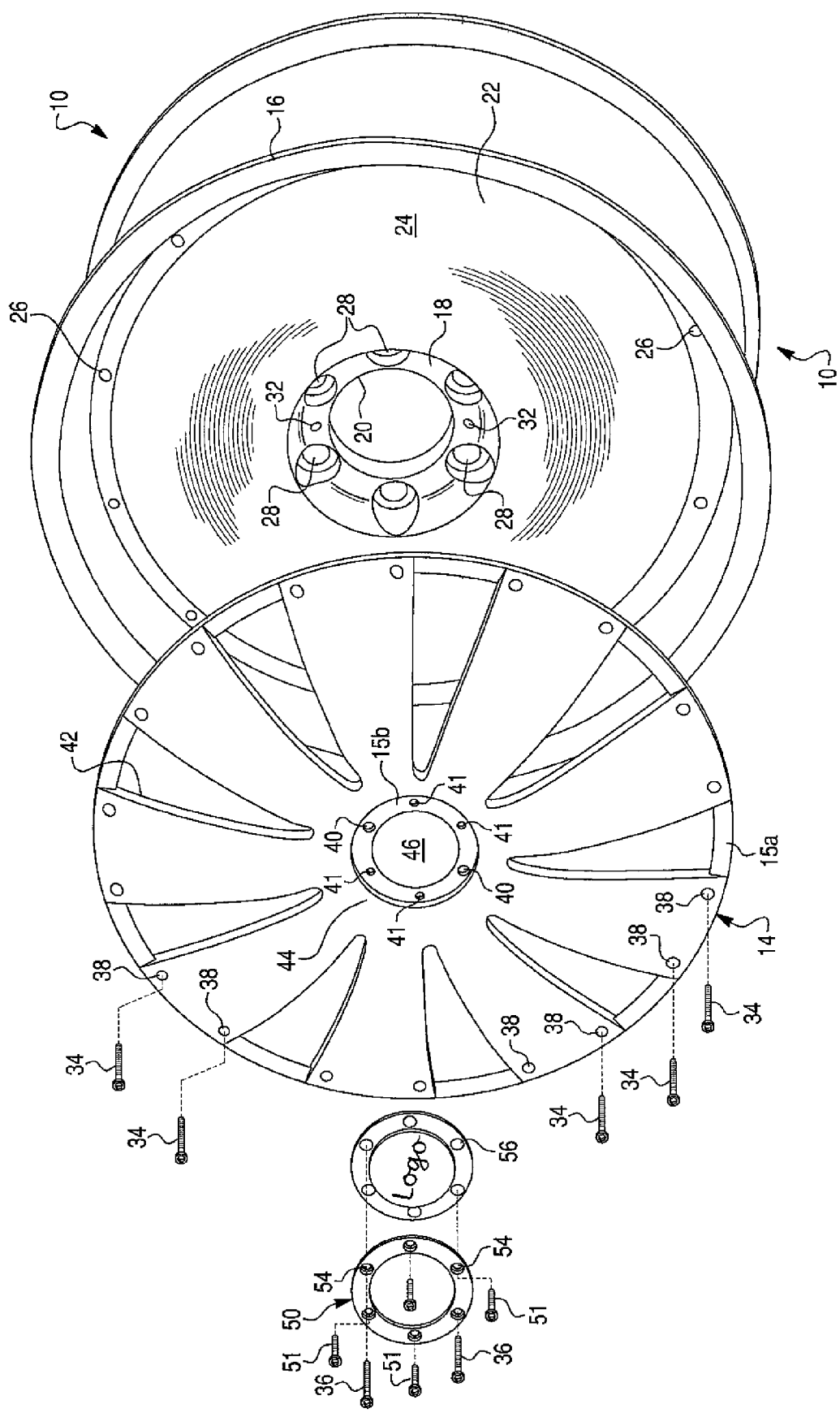
FIG. 11 is an exploded perspective view of the adaptable wheel assembly according to the alternative embodiment of the present invention.

In accordance with the preferred embodiment of the present invention, the cover member 14 is formed as a multi-piece assembly that comprises a plurality of separately formed cover sections, including a plurality of separately formed first cover sections 60a and at least one second cover section 60b, illustrated in FIGS. 5 and 6. Alternatively, as illustrated in FIGS. 10 and 11, the cover member 14 is homogeneously formed as a unitary single-piece body. Preferably, the cover member 14 is made of a plastic material. However, other materials, such metals, are within the scope of the present invention. Preferably, the cover member 14 includes two second cover sections 60b disposed radially opposite to each other. Further preferably, the first and second cover sections 60a and 60b are substantially identical in overall shape, size and appearance, as illustrated in FIG. 5. Alternatively, the first and second cover sections 60a and 60b can be different in overall shape, size and appearance. Further preferably, each of the cover sections 60a and 60b includes two opposite spokes 45 radially extended between a radially outer end 62 and a radially inner end 64 of each of the cover sections 60*a* and 60*b*, and defining the opening 47 between the spokes 45. As further illustrated in FIG. 5, the radially outer end 62 of each of the cover sections 60*a* and 60*b* has at least one of the first holes 38. The difference between the first and second cover sections 60*a* and 60*b* is that the radially inner end 64 of each of the first cover sections 60*a* has the threaded mounting hole 41, while the radially inner end 64 of each of the second cover sections 60*b* has the second hole 40. An inner diameter of the second hole 40 is large enough to receive the support cylinder 58 of the center cap 52 therethrough. Preferably, as illustrated in FIGS. 5 and 6, the cover member 14 includes four first cover sections 60*a* provided with the threaded mounting holes 41, and two second cover sections 60*b* provided with the second holes 40. It should be understood that the radially outer ends 62 of the first and second cover sections 60*a* and 60*b* define the radially outer end 15*a* of the cover member 14, while the radially inner ends 64 of the first and second cover sections 60*a* and 60*b* define the radially inner end 15*b* of the cover member 14.

Figure 9A:
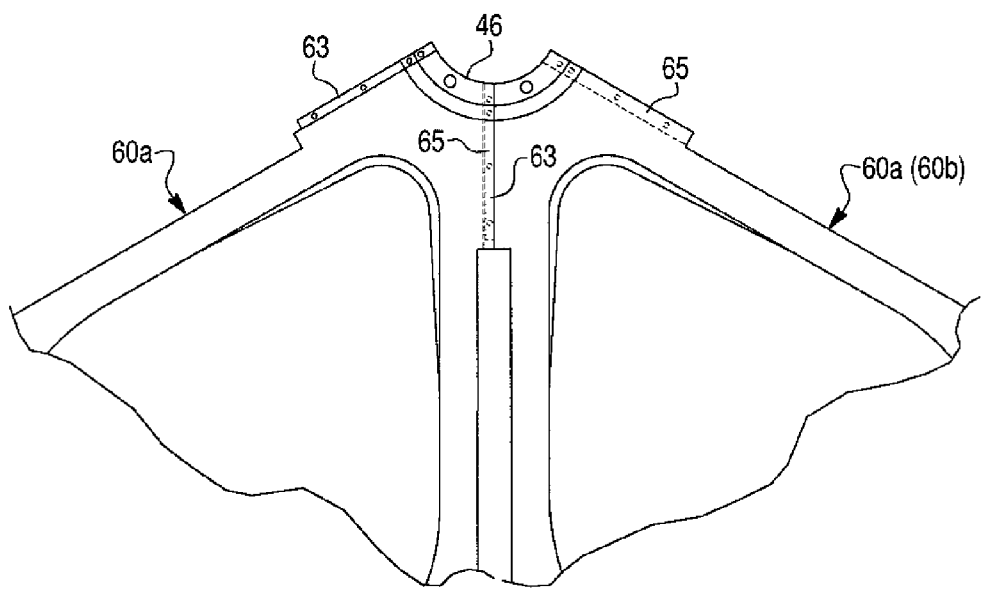
FIG. 9A is a partial front view of the cover member according to the preferred embodiment of the present invention showing two interconnected cover sections.
Figure 9B:
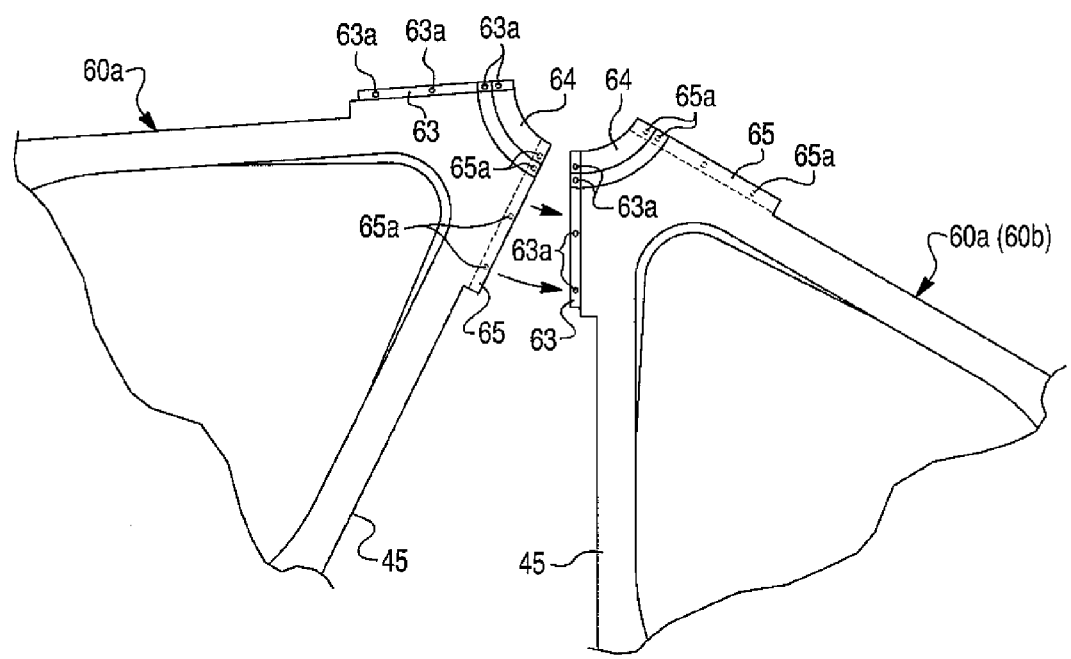
FIG. 9B is a partial front view of the cover member according to the preferred embodiment of the present invention showing two separated cover sections.

Furthermore, the radially inner end 64 of each of the first and second cover sections 60*a* and 60*b* is provided with a supporting lip 63 and a supporting groove 65 provided at the circumferentially opposite sides of the inner end 64 thereof, as illustrated in detail in FIGS. 9A and 9B. Moreover, the supporting lip 63 is provided with a number of holes 63*a* formed therethrough, while the supporting groove 65 is provided with a corresponding number of pins 65*a* outwardly extending therefrom in the direction toward the blank wheel 12, shown in detail in FIG. 9B. The supporting lip 63 and the supporting groove 65 of the adjacent cover sections 60*a* or 60*a* and 60*b* are configured to be complementary to each other. Moreover, the orientation and size of the pins 65*a* is complementary to the orientation and size of the holes 63*a*. In other words, when the cover member 14 is assembled of the plurality of the first and second cover sections 60*a* and 60*b*, as illustrated in FIG. 9A, the supporting lip 63 of each of the first and second cover sections 60*a* and 60*b* is received in the supporting groove 65 of the adjacent first or second cover sections 60*a* or 60*b*, while at the same time, the pins 65*a* are received in the complementary holes 63*a* of the adjacent first or second cover sections 60*a* or 60*b*, thus properly orienting the first and second cover sections 60*a* and 60*b* relative to each other and interconnecting the first and second cover sections 60*a* and 60*b*.

Figure 4:
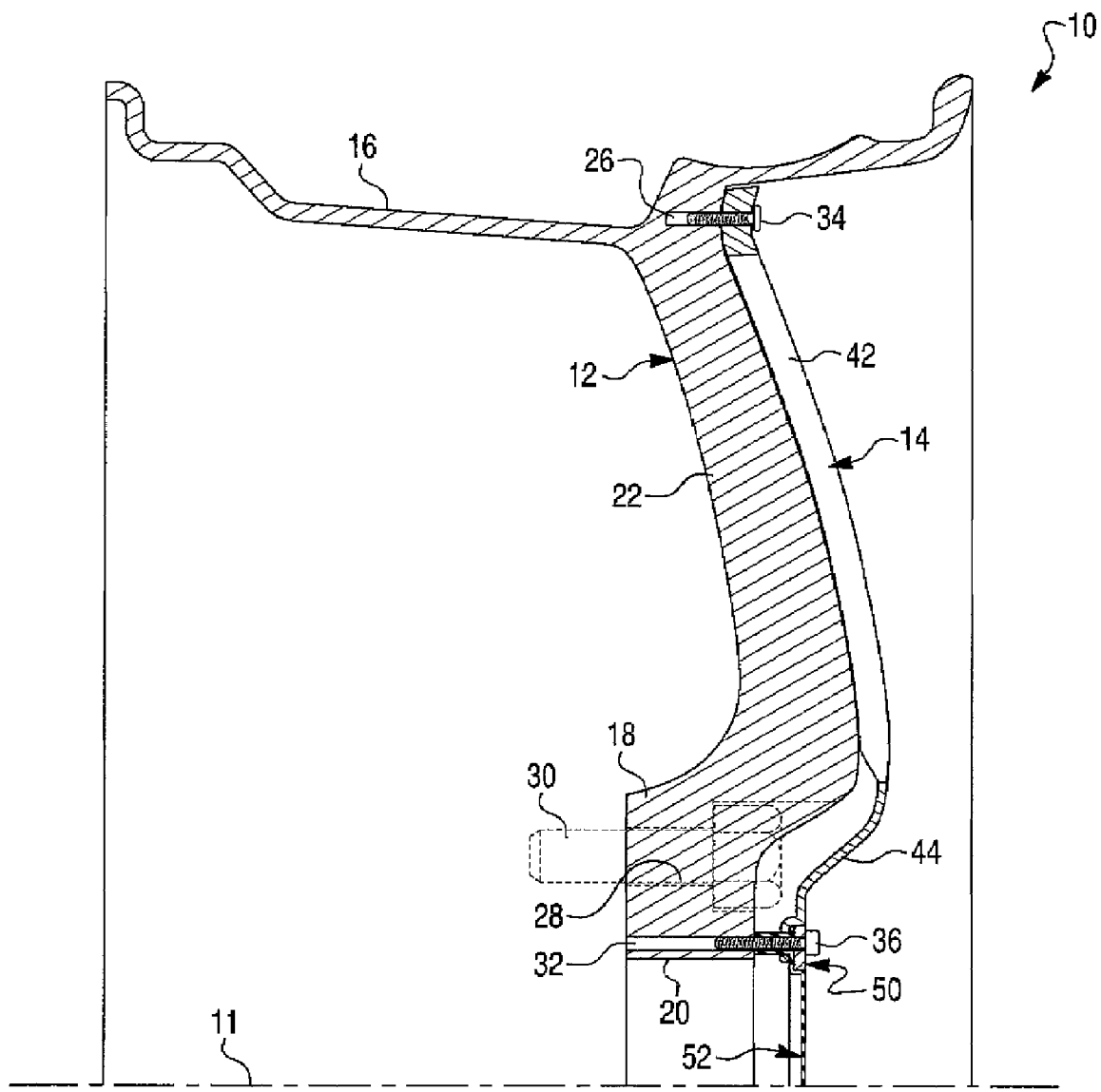
FIG. 4 is a sectional view of the adaptable wheel assembly according to the preferred embodiment of the present invention.

As illustrated in FIGS. 3 and 4, in the fully assembled wheel assembly 10, the connecting ring 50 and the center cap 52 are removably fastened to the radially inner end 64 of each of the first cover sections 60*a* with the plurality of the third threaded fasteners 51, which axially extend through the corresponding (not all) mounting holes 54 and 56 in the connecting ring 50 and the center cap 52, respectively, and threadedly engage the threaded mounting holes 41 in the first cover sections 60*a*. At the same time, the second threaded fasteners 36 axially extend through the remaining mounting holes 54 and 56 in the connecting ring 50 and the center cap 52, respectively, the through-holes 59 in the support cylinders 58 of the center cap 52 and the second holes 40 in second cover sections 60*b*, and threadedly engage the complementary second threaded holes 32 of the hub portion 18 of the blank wheel 12, thus removably fastening the mounting portion 44 of the cover member 14 to the blank wheel 12.

During the assembly of the wheel assembly 10, first, the first and second cover sections 60*a* and 60*b* of the cover member 14 are assembled together by engaging the supporting lips 63 of the first and second cover sections 60*a* and 60*b* with the supporting grooves 65 of the adjacent first or second cover sections 60*a* or 60*b* so that the pins 65*a* are received in the complementary holes 63*a* of the adjacent first or second cover sections 60*a* or 60*b* (as shown in FIGS. 9A and 9B). Then, the center cap 52 is placed over the mounting portion 44 of the cover member 14 so that the support cylinders 58 of the center cap 52 extend through the second hole 40 of the mounting portion 44 of the cover member 14 so that the through-holes 59 of the center cap 52 is in alignment with the second threaded holes 32 of the hub portion 18 of the blank wheel 12. As a result, the mounting holes 56 of the center cap 52 are oriented in alignment with the second holes 40 and the mounting holes 41 of the mounting portion 44 of the cover member 14. Then, the connecting ring 50 is placed over the center cap 52 and oriented so as to align the mounting holes 54 in the connecting ring 50 with the mounting holes 56 in the center cap 52. Afterward, the third threaded fasteners 51 which axially extend through the corresponding (not all) mounting holes 54 and 56 in the connecting ring 50 and the center cap 52, respectively, and threadedly engage the complementary threaded mounting holes 41 in the first cover sections 60*a* so as to firmly connect the connecting ring 50 and the center cap 52 to the first cover sections 60*a* of the cover member 14. Next, the second threaded fasteners 36 are axially inserted into the remaining mounting holes 54 in the connecting ring 50 to extend through the mounting holes 56 in the center cap 52, the through-holes 59 in the support cylinders 58 of the center cap 52 and the second holes 40 in the cover member 14, and threadedly engage the complementary second threaded holes 32 of the hub portion 18 of the blank wheel 12, thus removably fastening the mounting portion 44 (or the radially inner end 15*b*) of the cover member 14 to the blank wheel 12. Then, the radially outer end 15*a* of the cover member 14 is removably fastened to the blank wheel 12 with the first threaded fasteners 34 which axially extend through the first holes 38 in the cover member 14 and threadedly engage the complementary first threaded holes 26 in the disk portion 22 of the blank wheel 12.

In accordance with the present invention, there is provided at least one but preferably a set of different interchangeable cover members 14 and/or interchangeable center caps 52 for a particular blank wheel 12 that have different ornamental design and are selectively mounted to the blank wheel 12 by the first and second threaded fasteners 34 and 36 (as shown in FIGS. 3, 6 and 10, 11). These interchangeable cover members have similar or even identical mounting portions but different ornamental design of ornamental portions. Moreover, each of the interchangeable cover members has first and second holes complementary to the first and second threaded holes of the particular blank wheel. As a result, a user can change an ornamental appearance of the adaptable wheel assembly 10 at will by replacing one of the interchangeable cover members from the set to another. In other words, with a plurality of the different interchangeable cover members 14, the user may readily change or interchange these different cover members 14 to change and update a style and look of the wheel assembly 10.

The invention thus provides a system whereby custom wheels may be altered and updated without the need to purchase an entirely new set of wheels. This invention reduces the cost to change the style of a wheel. Further, the invention is environmentally friendly because it reduces the number of wheels that are manufactured and/or the number of wheels a user must discard.

The foregoing description of the preferred embodiment of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. An adaptable wheel assembly comprising:

a wheel having a central axis and including an annular rim portion coaxial to said central axis, an annular hub portion provided with a pilot bore coaxial with said central axis and an annular disk portion radially extending between said rim portion and said hub portion; and a front cover member removably attached to said wheel by a plurality of first threaded fasteners provided adjacent said rim portion and at least one second threaded fastener provided adjacent said pilot bore and radially inside said first threaded fasteners;

said disk portion being formed without decorative windows therethrough and having an angularly uniform, uninterrupted axially outer surface defined as a surface of revolution;

said disk portion having a plurality of first threaded holes provided adjacent said rim portion and circumferentially spaced from each other for receiving said first threaded fasteners;

said hub portion including a plurality of angularly spaced lug holes and at least one second threaded hole spaced from said lug holes and provided for receiving said at least one second threaded fastener;

said cover member having a plurality of first holes therethrough being in alignment with said first threaded holes of said wheel and at least one second hole therethrough being in alignment with said at least one second threaded hole of said wheel;

said cover member further having a central hole therethrough coaxial with said pilot bore in said wheel and a plurality of decorative openings therethrough radially spaced from said central hole so as to expose said axially outer surface of said disk portion of said wheel;

said first threaded fasteners extending through said first holes in said cover member and engaging said first threaded holes in said wheel;

said at least one second threaded fastener extending through said at least one second hole in said cover member and engaging said at least one second threaded hole in said wheel.

2. The adaptable wheel assembly as defined in claim 1, wherein said cover member includes an ornamental portion covering said disk portion of said wheel and including said first holes therethrough, and a mounting portion covering said hub portion of said wheel and including said at least one second hole therethrough; and wherein said ornamental portion of said cover member has an axially outer surface and an axially inner surface disposed opposite said axially outer surface in the direction of said central axis of said wheel and facing said disk portion of said wheel;

said inner surface of said ornamental portion of said cover member is contoured complementary to said axially outer surface of said disk portion of said wheel so as to continuously engage said axially outer surface of said disk portion of said wheel both radially and circumferentially.

3. The adaptable wheel assembly as defined in claim 2, wherein said mounting portion of said cover member is axially spaced from said hub portion of said wheel in the direction of said central axis so as to cover said lug holes in said hub portion of said wheel.

4. The adaptable wheel assembly as defined in claim 1, further including a connecting ring formed separately from said cover member; said connecting ring engaging said cover member at a radially inner end thereof; said connecting ring provided with at least one mounting hole aligned with said at least one second hole so that said at least one second threaded fastener extends through said at least one mounting hole and said at least one second hole in said cover member and threadedly engages said at least one second threaded hole in said wheel so as to fasten said cover member to said wheel body.

5. The adaptable wheel assembly as defined in claim 4, further including a center cap formed separately from said cover member and provided to cover said pilot bore;

said center cap includes at least one mounting hole being in alignment with said at least one second hole in said mounting portion of said cover member.

6. The adaptable wheel assembly as defined in claim 1, wherein said cover member includes a plurality of spokes radially extending from said mounting portion of said cover member and circumferentially spaced from each other so as to expose said outer surface of said disk portion of said wheel.

7. The adaptable wheel assembly as defined in claim 1, wherein said cover member is formed as a multi-piece assembly tat comprises a plurality of separately formed cover sections including a plurality of separately formed first cover sections and at least one second cover section each having a radially outer end and a radially inner end; each of said first and second cover sections having at least one of said first holes at said radially outer end thereof; said at least one second cover section having said at least one second hole at said radially inner end thereof.

8. The adaptable wheel assembly according to claim 1, wherein said cover member is homogeneously formed as a unitary single-piece part.

9. The adaptable wheel assembly according to claim 1, wherein said front cover member is interchangeably fastened to said wheel with an additional front cover member; said front cover member and said additional front cover member have similar mounting portions and different ornamental designs of their respective ornamental portions.

* * * * *